United States Patent [19]

Anderson

[11] Patent Number: 4,578,204

[45] Date of Patent: Mar. 25, 1986

[54] HIGH VOLTAGE ELECTROLITE

[75] Inventor: Daniel J. Anderson, Indianapolis, Ind.

[73] Assignee: Emhart Industries, Inc., Indianapolis, Ind.

[21] Appl. No.: 602,543

[22] Filed: Apr. 20, 1984

[51] Int. Cl.⁴ .............................................. H01G 9/00
[52] U.S. Cl. .................................... 252/62.2; 361/433
[58] Field of Search ............ 252/62.2; 361/433, 433 E

[56] References Cited

U.S. PATENT DOCUMENTS

| 2,155,086 | 4/1939 | Georgiev | 252/62.2 |
| 3,138,746 | 6/1964 | Burger | 252/62.2 |
| 3,546,119 | 12/1970 | Chesnot | 252/62.2 |
| 3,670,212 | 6/1972 | Anderson | 252/62.2 |
| 3,719,602 | 3/1973 | Anderson | 252/62.2 |
| 4,024,442 | 5/1977 | Anderson | 252/62.2 |

Primary Examiner—John F. Niebling
Attorney, Agent, or Firm—Robert F. Meyer

[57] ABSTRACT

An electrolytic capacitor comprising a pair of electrodes at least one of which is composed essentially of a film-forming metal and has a dielectric oxide film thereof, and an electrolyte consisting essentially of a liquid salt of a tertiary amine and glacial acetic acid dissolved in a mono-alkyl ether of diethylene glycol in a weight ratio of about 1:30 to 1:9.

8 Claims, 1 Drawing Figure

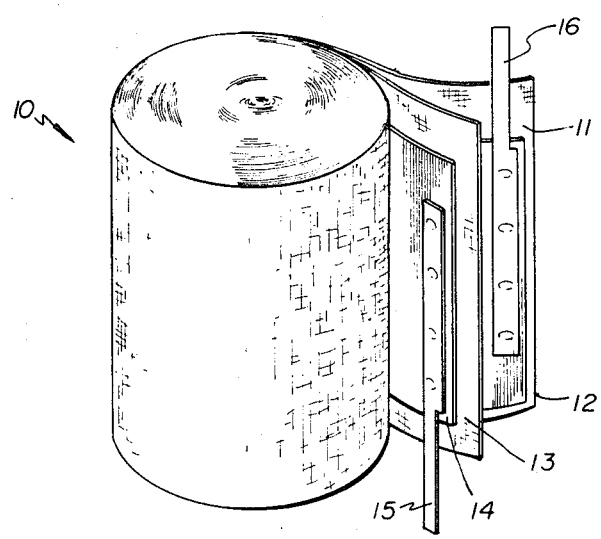

HIGH VOLTAGE ELECTROLITE

BACKGROUND OF THE INVENTION

This invention relates to electrolytes for electrolytic devices and has specific pertinence to an improved low temperature electrolyte which provides a high sparking voltage for use in capacitors.

Those skilled in the art are aware that virtually every dielectric oxide film electrolytic capacitor formed by conventional electroforming techniques are possessed of numerous imperfections and irregularities which increase the leakage current and reduce the dielectric strength in capacitors. The addition of an electrolyte serves not only as a conductive solution for transporting electrical charges between the anode and the cathode, but also provides oxygen for repair of the imperfect anodic dielectric film.

Among the many desirable characteristics of a capacitor electrolyte, perhaps the most difficult to achieve is a high sparking voltage over a broad range of operating temperatures. This problem is most acute in the low temperature range, for example, between −40° C. and =55° C. A high sparking voltage indicates an ability of the electrolyte to resist chemical breakdown at high voltages. Such breakdown causes arcing between the capacitor electrodes which, in most instances, causes catastrophic failure of the capacitor.

Prior to the present invention, high voltage electrolytes (350 to 500 volts) have been composed of boric acid, ammonia and/or ammonium pentaborate dissolved in ethylene glycol. The highest sparking voltage obtainable with this sytem is about 525 volts, and its low temperature characteristics are poor because of the viscous nature of the system. The electrolyte of the present invention provides a sparking voltage of at least 620 volts.

SUMMARY OF THE INVENTION

According, there is provided an electrolytic capacitor which in general comprises a pair of electrodes at least one of which is composed essentially of a film-forming metal and has a dielectric oxide film thereon, and an electrolyte consisting essentially of a liquid salt of a tertiary amine and glacial acetic acid dissolved in a mono-alkyl ether of diethylene glycol in a weight ratio of from about 1:3 to 1:9.

DESCRIPTION OF THE DRAWINGS

The sole FIGURE is a perspective view of a partially unwound electrolytic capacitor body.

DETAILED DESCRIPTION OF THE INVENTION

Referring now to the drawing, there is shown an electrolytic capacitor of the wound foil type denoted generally by reference numeral 10. Capacitor 10 comprises anode 12 of film-forming metal (e.g., aluminum, tantalum, niobium, zirconium) having on its surface an oxide film which functions as the active dielectric for the capacitor. The dielectric oxide film is formed on anode 12 in accordance with the accepted anodization techniques. Cathode 14 may be composed of either a film-forming metal or a relatively inert metal such as silver, depending upon the capacitor application and its requirements. Anode 12 and cathode 14 are separated by spacer strips 11 and 13 composed of paper or other porous material. Spacers 11 and 13 are impregnated with the electrolyte of the present invention. Electrodes 12 and 14 are provided with tabs 16 and 15, respectively, to serve as terminals for capacitor 10. Tabs 15 and 16 may extend from the same or opposite ends of the capacitor.

In accordance with the present invention, the electrolyte consists essentially of a liquid salt of a tertiary amine and glacial acetic acid dissolved in a mono-alkyl ether of diethylene glycol in a weight ratio of about 1:3 to 1:9. Examples of a tertiary amine suitable in the electrolyte of the present invention are triethylamine and tributylamine. An example of a suitable mono-alkyl ether diethylene glycol is diethylene glycol monomethyl ether (methyl carbitol). Tests have shown that with this sytem sparking voltages of 620 volts and higher can be obtained.

A minor amount of phosphoric acid may be added to improve the shelf life characteristics of the electrolyte. In addition, a minor amount of boric acid may be added to overcome a sparking voltage drop caused by the phosphoric acid addition.

The range of preferred composition for the electrolyte is:

| Constituent | Percent by total weight |
| --- | --- |
| triethylamine | 4–14 |
| glacial acetic acid | 4–14 |
| methyl carbitol | 66–90 |
| boric acid | 1–5 |
| 85% phosphoric acid | 0.1–1.0 |

Not only does the electrolyte of the present invention provide vastly improved sparking voltages, it also provides better electrical characteristics, especially at low temperatures, as can be seen by the following examples.

EXAMPLE I

A group of high voltage capacitors rated 120 microfarads at 450 volts are impregnated with an electrolyte having an approximate formulation by percent of total weight of: liquid salt of triethylamine and glacial acetic acid-17.5%, methyl carbitol-80%, boric acid-2.5%, and 85% phosphoric acid-less than 0.5%. After aging and assembly, the capacitors were subjected to life testing and measurements along with similar capacitors impregnated with a prior electrolyte of boric acid and ammonia dissolved in ethylene glycol. The following table shows the results on capacitors in microfarads.

|  | +25° C. | −40° C. | % change |
| --- | --- | --- | --- |
| Exp. I | 106.2 | 77.47 | −27.1 |
| Prior Art | 106.7 | 46.9 | −56.1 |

And the Equivalent Series Resistance (ESR) is measured:

|  | +25° C. | −40° C. | % change |
| --- | --- | --- | --- |
| Exp. I | .593 | 19.6 | +3200 |
| Prior Art | .734 | 131.9 | +17870 |

On 85° C. life test the following results are observed:

|  | Initial | | | 1000 Hours | | |
|---|---|---|---|---|---|---|
|  | Capacitance | ESR | D.C. leakage (milliamps) | Capacitance | ESR | D.C. leakage (milliamps) |
| Exp. I | 108.6 | .625 | 1.34 | 106.6 | .517 | .034 |
| Prior Art | 108.3 | .680 | .106 | 106.3 | .486 | .015 |

EXAMPLE II

A group of high voltage capacitors rated at 1200 microfarads at 450 volts are impregnated with the same electrolyte as that of Example I, aged and assembled along with capacitors having the prior art electrolyte of Example I. The following comparative date was taken:

|  | +25° C. | −40° C. | % change |
|---|---|---|---|
|  | Capacitance - microfarads | | |
| Exp. II | 1263.6 | 1025.4 | −18.9 |
| Prior Art | 1259.5 | 455.0 | −63.9 |
|  | ESR | | |
| Exp. II | .069 | 1.80 | +2500 |
| Prior Art | .079 | 15.0 | +18,900 |

The capacitors are also put on 85° C. shelf life test (no voltage applied) for 262 hours with the following results:

|  | Initial | | | 262 Hours | | |
|---|---|---|---|---|---|---|
|  | Capacitance | ESR | D.C. leakage (milliamps) | Capacitance | ESR | D.C. leakage (milliamps) |
| Exp. II | 1263.6 | .069 | 2.18 | 1252.6 | .063 | 3.94 |
| Prior Art | 1259.5 | .079 | 1.26 | 1249.1 | .072 | 1.07 |

Thus the data shows that, not only does the electrolyte exhibit high sparking voltages, but has improved electrical characteristics, especially in respect to capacitance at low temperature and equivalent series resistance.

What is claimed is:

1. An electrolytic capacitor having a sparking voltage of at least 620 volts comprising a pair of electrodes at least one of which is composed essentially of a film-forming metal and has a dielectric oxide film thereof, and an electrolyte consisting essentially of a liquid salt of a tertiary amine and glacial acetic acid, said liquid salt dissolved in a mono-alkyl ether of diethylene glycol in a weight ratio of about 1:3 to 1:9.

2. An electrolytic capacitor according to claim 1, wherein said tertiary amine salt is selected from triethylamine and tributylamine.

3. An electrolytic capacitor according to claim 2, wherein said tertiary amine is triethylamine.

4. An electrolytic capacitor according to claim 3, wherein said mono-alkyl ether of diethylene glycol is diethylene glycol monomethyl ether.

5. An electrolytic capacitor according to claim 4, wherein minor amounts of phosphoric acid and boric acid are added.

6. An electrolytic capacitor according to claim 1 wherein said electrolyte consists essentially of:

| Constituent | Percent by total weight |
|---|---|
| triethylamine | 4–14 |
| glacial acetic acid | 4–14 |
| methyl carbitol | 90–66 |
| boric acid | 1–5 |
| 85% phosphoric acid | 0.1–1.0. |

7. An electrolytic capacitor according to claim 1, wherein said film-forming metal is selected from the group consisting of aluminum, tantalum, niobium and zirconium.

8. An electrolytic capacitor according to claim 7, wherein the anode electrode consists essentially of a metal selected from said film-forming metals and said cathode consissts essentially of a metal selected from the group consisting of aluminum, tantalum, niobium, zirconium and silver.

* * * * *